United States Patent [19]

Dennert et al.

[11] Patent Number: 4,826,788
[45] Date of Patent: May 2, 1989

[54] COMPOSITION FOR PRODUCING FOAMED GLASS MOLDED PRODUCTS

[75] Inventors: Heinz Dennert, Trosdorfer Weg, D-8609 Bischberg; Hans V. Dennert, Schloss Breitenlohe, D-8602 Burghaslach; Alois Seidl, Lam, all of Fed. Rep. of Germany

[73] Assignees: Heinz Dennert, Bischberg; Hans Veit Dennert, Burghaslach, both of Fed. Rep. of Germany

[21] Appl. No.: 62,363

[22] Filed: Jun. 12, 1987

Related U.S. Application Data

[63] Continuation of Ser. No. 759,167, Jul. 26, 1985, abandoned.

[30] Foreign Application Priority Data

Jul. 31, 1984 [DE] Fed. Rep. of Germany ....... 3428165

[51] Int. Cl.$^4$ .............................................. C03B 19/08
[52] U.S. Cl. ....................................... 501/39; 501/85; 501/155; 106/75; 65/22
[58] Field of Search .......................... 501/39, 85, 155; 106/75; 65/22

[56] References Cited

U.S. PATENT DOCUMENTS

| | | | |
|---|---|---|---|
| 2,156,457 | 5/1939 | Long | 65/22 X |
| 3,325,264 | 6/1967 | Marceau | 501/39 X |
| 3,874,861 | 4/1975 | Kurz | 65/22 X |
| 3,951,632 | 4/1976 | Seki et al. | 501/39 X |
| 4,332,907 | 6/1982 | Vieli | 501/155 X |
| 4,347,326 | 8/1982 | Iwami et al. | 501/39 |
| 4,430,107 | 2/1984 | Dennert et al. | 501/39 X |

FOREIGN PATENT DOCUMENTS

0052693 6/1983 European Pat. Off. .

*Primary Examiner*—William R. Dixon, Jr.
*Assistant Examiner*—Karl Group
*Attorney, Agent, or Firm*—Spencer & Frank

[57] ABSTRACT

A composition and process for producing a foamed glass molded product, the process employing a composition which is a mixture of one part by weight of a finely ground glass containing more than 25 weight % alkali metal oxide; from 21 to 400 parts by weight of a finely ground glass containing less than 16 weight % alkali metal oxide; water present in a water to solids weight ratio ranging from 1:1.4 to 1:3.0; and a foaming agent. The combined ingredients are heated to release gasses from the foaming agent and thereby foam the glass. The foamed glass moldings may be granules or cast shapes.

18 Claims, No Drawings

COMPOSITION FOR PRODUCING FOAMED GLASS MOLDED PRODUCTS

This application is a continuation of application Ser. No. 759,167, filed July 26, 1985, abandoned.

BACKGROUND OF THE INVENTION

1. Field of the Invention

The present invention relates to a composition and process for producing foamed glass molded products, and more particularly to a process wherein a mixture of (a) finely ground glass containing more than 16 weight % alkali metal oxide (hereinafter, glass type A) and (b) finely ground glass containing less than 16 weight % alkali metal oxide (hereinafter, glass type B) are mixed with water and with foaming agent additives, and optionally fillers, and the mixture is foamed at an elevated temperature.

2. Discussion of the Art

A process for producing foamed glass molded products is disclosed in European Publication No. 0 052 693, which corresponds to U.S. Pat. No. 4,430,107, to present coinventors Dennert and Dennert, the disclosure of which is herein incorporated by reference. In this earlier process, ground glass of glass types A and B, in which 95 weight % have a grain size below 0.1 mm, are used in a weight ratio of A to B ranging from 1:1.5 to 1:20. Suitable glasses containing more than 16 weight % alkali metal oxide are specialty glasses, such as piece glass. Any waste glass, e.g. bottle glass or window glass, can be used as the glass containing less than 16 weight % alkali metal oxide. A mixture of the glasses is prepared which includes water, and preferably water having a temperature ranging from 50 to 95° C., most preferably 95° C. The weight ratio of water to total solids ranges from 1:1.4 to 1:2.5. The blend produced by mixing water and the total solids is briefly stirred in a stirring vessel. Such mixing frequently makes the blended mixture considerably more viscous.

Viscosity can be further increased by the addition of fillers, preferably inorganic fillers. Calcium carbonate in the form or marble, chalk or the like is a preferred filler; however, barium carbonate, dolomite or comparable substances can also be used.

A suitable driving or foaming agent is mixed in with the other ingredients, either before or after the other ingredients are blended together. Used in combination as foaming agents are organic substances, such as sugar and molasses, which may be pyrolyzed at temperatures on the order of 600° C., to release carbon and carbon monoxide gas, and substances which release oxygen gas, such as pyrolusite ($MnO_2$), when heated at temperatures on the order to 700 to 900° C. These driving or foaming agents can be added to the starting materials or to the blended mixture produced therefrom. Depending on the desired shape of the end product, the blended ingredients are either granulated or poured into molds. The term "molded products" as used herein is intended to include molded plates or other cast bodies, as well as, granules. The granules or cast pieces (for example, molded plates) are then foamed at an elevated temperature, for example, at a temperature ranging from 700 to 900° C.

The earlier process of European Publication No. 0 052 693 has been found satisfactory from a technical point of view. The resulting foamed glass molded products have a low weight per unit volume ranging from 0.1 to 1.1 g/cm³ and good strength. However, foamed glass molded products of the above-described type are typically employed as auxiliary construction materials and must be manufactured as inexpensively as possible. As is known, the price of such products depends in part on the cost of the raw materials employed. In the present case, the cost of the required quantity of specialty glass containing more than 16 weight % alkali metal oxide represents the most costly raw material.

SUMMARY OF THE INVENTION

It is an object of the present invention to provide a low cost composition and process for producing foamed glass molded products which have low weight per unit volume and good strength. Thus, the present invention is seeking to modify the earlier composition and process in order to make them more economical without thereby incurring a reduction in quality of the product produced by the process.

The purpose of the present invention is accomplished by providing a composition useful in the manufacture of foamed glass molded products by a thermal treatment, the composition comprising:

a. one part by weight of a finely ground glass containing at least 25 weight percent alkali metal oxide;

b. from 21 to 400 parts by weight of a finely ground glass containing less than 16 weight percent alkali metal oxide;

c. water; and d. a foaming agent.

The purpose of the present invention is further accomplished by a process comprising combining the ingredients of the composition; and heating the combined ingredients to a temperature at least sufficient to foam the glass.

The purpose of the present invention is additionally accomplished by providing a foamed glass molded product prepared by combining the ingredients of the composition; and heating the combined ingredients to a temperature at least sufficient to foam the glass.

DETAILED DESCRIPTION OF THE INVENTION

It was discovered that use of an alkali metal oxide rich, specialty glass (glass type A) component having an alkali metal oxide content of at least 25 weight % was efficacious and advantageous. With a higher alkali metal oxide content for the type A glass ingredient, it was unexpectedly determined that a glass type weight ratio of A to B ranging from 1:21 to 1:400, produced a foamed glass molded product having both the desired economy and good physical properties. Thus, the increased alkali metal oxide content was determined to make it possible to select the weight ratio of the types of glass employed as stated above. This has the practical result of making it possible to provide an acceptable product with a relatively small amount of the relatively expensive glass type A, a specialty glass, such as piece glass, but not including water glass.

Further, the present composition and process can be implemented in a particularly simple manner if glass type A has an alkali metal oxide content of at least 30 weight %. Moreover, it is preferred that 95 weight % of the glass type A have a grain size below 260 micron. Further, it is preferred that at least 50 weight % of the glass type B have a grain size below 32 micron, the remainder below 90 micron. This preference is surprising in view of the prior art teaching that 95 weight % of both glass types should have a grain size below 0.1 mm, i.e., 100 microns.

The mentioned relations are based on the knowledge that glasses with a high alkali metal oxide content solve easier the higher the alkali metal oxide content is. With regard to this knowledge here are used greater grains in order to extend the solving-process over the entire duration of the treating.

In numerous experiments performed in the development of the process proposed herein, it has been found that particularly advantageous results are obtained if the two starting glass types (A and B) are mixed with water which has a pH between 8 and 13.8, preferably between 9 and 12. To adjust the water to this pH range, it is merely necessary to employ low concentrations of suitable hydroxides, preferably sodium hydroxide, which do not encumber the process from an economical point of view and have no noticeable influence on the alkali metal content of the final product. Thus, within the stated pH range of from 8 to 13.8, a narrower range of from 9 to 12 has been found to be particularly suitable.

As in the referenced prior art process, the weight ratio of water to total solids employed preferably ranges from 1:1.4 to 1:2.5. It has been determined that the ratio can be advantantageously expanded, however, to 1:3.0. Further, as in the referenced prior art process, up to 10 weight percent, based on the weight of the total solids, of the combined foaming agent ingredients are used.

Advantagely in the frame of the invention foaming agents are used in following concentrations:
Sugar o,1-1,0 weight-Perc.
Molasses 0,4-5,o weight-Perc.
Pyrolusite 0,1-1,0 weight-Perc.
whereby the Pyrolusite-concentration has to be adjusted at least to the content of sugar or the fourfold quantity of Molasses.

The present invention will now be described in greater detail with the aid of a few Examples. The example formulations were produced according to the following general formulating instructions:

| Glass type A: | Specialty glass | 0.24 to 4.757 kg |
| Glass type B: | Waste glass | 95.4 to 91.4 kg |
| Foaming agents: | Molasses or sugar | 1.00 kg |
| | Pyrolusite | 0.25 kg |
| Inorganic fillers: | Calcium carbonate or dolomite | 3.00 kg |
| pH adjuster: | NaOH | 0.13 kg |

In the Examples which follow, reference is made to the attached Table 1. The quantities of specialty glass (glass type A) and waste glass (glass type B) listed therein were separately ground to a fine consistency and subsequently were mixed together. The grinding was effected in such a manner that 95 weight % of the specialty glass, type A, had a grain size below 250 microns. For glass type B, which was conventional bottle glass, at least 50 weight % had a grain size below 32 microns, the remainder below 90 microns.

The specialty glass, glass type A, had the following composition:
68 weight % $SiO_2$
27 weight % $Na_2O$ and
5 weight % other metal oxides.

The resulting glass mixture was blended in a stirring vessel with the stated quantities of sugar, molasses, pyrolusite and calcium carbonate or dolomite. The pyrolusite employed contained 70 weight % $MnO_2$. In the experiments, water was used which had a temperature of 90° C. and stirring continued for a total of 10 minutes. Instead of the warm water, cold water can also be used, however, the stirring time must be extended considerably. Thus, preferably, water having a temperature ranging from 50 to 95° C. is used.

In some of the examples, the carbonate quantity listed in Table 1 was added in the form of calcium carbonate. Moreover, in some of the examples, the water employed had been made weakly alkaline by the addition of NaOH.

The resulting mixture was then mixed with approximately 500 kg of finely ground "subsize" granules, i.e., granules having a grain size of less than 0.2 mm, and "supersize" granules, i.e., granules having a grain size in excess of 8.0 mm, from earlier starting mixtures of the same composition in order to facilitate comminution and the entire mass was granulated in a commercially available granulator or comminutor. The magnitude of the resulting granulate ranged from 0.5 to 2.0 mm.

After emptying the granulator, the resulting granulate was heated to 300° C. in a drying drum and thus dried. In a screening machine, the granulate leaving the drum was separated into subsize, supersize and usable-size granules.

The subsize granules and the supersize granules, which were comminuted in the comminutor, were returned to a storage silo and reused in the granulation of a new starting mixture. The resulting usable-size granules, having a grain size ranging from 0.2 mm to 8.0 mm, were mixed with 20 weight % clay meal (a separating agent) and expanded at 780° C. in a foaming pipe to five times their volume. Although the foaming temperature used in these examples was 780° C., temperatures ranging from 750° C. to 850° C. can be used. After separation of the excess separating agent, a granulate was available which had a grain size of 4 to 6 mm and a bulk weight of 185 kg/m³.

A total of 19 example formulations were prepared according to the above-described general formulating instructions. Details, as well as the resulting grain densities, are listed in Table 1 which follows.

It will be understood that the above description of the present invention is susceptible to various modifications, changes and adaptations, and the same are intended to be comprehended within the meaning and range of equivalents of the appended claims.

TABLE 1

| | | | | Examples: all values in kg | | | | | | |
| No. | Spec. glass A | Waste glass B | $\frac{A}{B}$ | Sugar | Molasses | Pyrolusite | Carbonate | NaOH | Total alkali | Grain density g/cm³ |
| --- | --- | --- | --- | --- | --- | --- | --- | --- | --- | --- |
| 1 | 4.975 | 94.52 | 1:19 | 0.25 | — | 0.25 | — | — | 12.9 | 0.19 |
| 2 | 3.980 | 95.52 | 1:24 | 0.25 | — | 0.25 | — | — | 12.72 | 0.20 |
| 3 | 2.985 | 96.51 | 1:32.3 | 0.25 | — | 0.25 | — | — | 12.54 | 0.21 |
| 4 | 1.990 | 97.51 | 1:49 | 0.25 | — | 0.25 | — | — | 12.36 | 0.22 |
| 5 | 0.995 | 98.50 | 1:99 | 0.25 | — | 0.25 | — | — | 12.18 | 0.23 |
| 6 | 4.796 | 91.12 | 1:19 | — | 1.0 | 0.25 | 3.0 | — | 12.9 | 0.18 |

TABLE 1-continued

| | | | | Examples: all values in kg | | | | | |
|---|---|---|---|---|---|---|---|---|---|
| No. | Spec. glass A | Waste glass B | A/B | Sugar | Molasses | Pyrolusite | Carbonate | NaOH | Total alkali | Grain density g/cm³ |
| 7 | 2.877 | 93.04 | 1:32.3 | — | 1.0 | 0.25 | 3.0 | — | 12.54 | 0.19 |
| 8 | 0.959 | 94.96 | 1:99 | — | 1.0 | 0.25 | 3.0 | — | 12.18 | 0.205 |
| 9 | 4.784 | 90.90 | 1:19 | — | 1.0 | 0.25 | 3.0 | 0.25 | 13.15 | 0.17 |
| 10 | 2.870 | 92.82 | 1:32.3 | — | 1.0 | 0.25 | 3.0 | 0.25 | 12.79 | 0.18 |
| 11 | 0.956 | 94.73 | 1:99 | — | 1.0 | 0.25 | 3.0 | 0.25 | 12.43 | 0.21 |
| 12 | 4.790 | 91.01 | 1:19 | — | 1.0 | 0.25 | 3.0 | 0.13 | 13.03 | 0.17 |
| 13 | 2.874 | 92.92 | 1:32.3 | — | 1.0 | 0.25 | 3.0 | 0.13 | 12.67 | 0.173 |
| 14 | 0.958 | 94.84 | 1:99 | — | 1.0 | 0.25 | 3.0 | 0.13 | 12.31 | 0.21 |
| | | | | | | | MgCO₃, CaCO₃ | | | |
| 15 | 4.790 | 91.01 | 1:19 | — | 1.0 | 0.25 | 3.0 | 0.13 | 13.03 | 0.165 |
| 16 | 2.874 | 92.92 | 1:32.3 | — | 1.0 | 0.25 | 3.0 | 0.13 | 12.67 | 0.173 |
| 17 | 0.958 | 94.84 | 1:99 | — | 1.0 | 0.25 | 3.0 | 0.13 | 12.31 | 0.200 |
| 18 | 0.500 | 95.13 | 1:190 | — | 1.0 | 0.25 | 3.0 | 0.13 | 11.71 | 0.22 |
| 19 | 0.250 | 95.38 | 1:381.5 | — | 1.0 | 0.25 | 3.0 | 0.13 | 11.66 | 0.26 |

What is claimed is:

1. A composition useful in the manufacture of foamed glass molded products by a thermal treatment, the composition comprising:
   a. one part by weight of a finely ground silicate specialty glass formed by a process including melting and containing at least 25 weight percent alkali metal oxide;
   b. from 21 to 400 parts by weight of a finely ground silicate waste glass containing less than 16 weight percent alkali metal oxide;
   c. water; and
   d. a foaming agent.

2. A composition according to claim 1, wherein said finely ground specialty glass containing at least 25 weight percent alkali metal oxide contains at least 30 weight percent alkali metal oxide.

3. A composition according to claim 1, wherein at least 95 weight percent of said finely ground specialty glass containing at least 25 weight percent alkali metal oxide has a grain size of less than 250 microns.

4. A composition according to claim 1, wherein at least 50 weight percent of said finely ground waste glass containing less than 16 weight percent alkali metal oxide has a grain size of less than 32 microns and the remainder has a grain size of less than 90 microns.

5. A composition according to claim 1, wherein said water has a pH ranging from 8 to 13.8.

6. A composition according to claim 1, wherein said water has a pH ranging from 9 to 12.

7. A composition according to claim 1, wherein the ratio of water to total solids ranges from 1:1.4 to 1:3.0.

8. A composition according to claim 1, wherein the water has a temperature ranging from 50 to 95° C.

9. A composition according to claim 1, wherein said composition comprises up to 10 weight percent, based on the weight of total solids, of said foaming agent.

10. A composition according to claim 1, wherein said foaming agent comprises, in combination, an organic substance which releases carbon and carbon monoxide gas when heated to a temperature of at least about 600° C. and a substance which releases oxygen gas when heated to a temperature of at least about 700° C.

11. A composition according to claim 10, wherein said organic substance which releases carbon and carbon monoxide gas is selected from the group consisting of sugar, molasses, and mixtures thereof, and wherein said substance which releases oxygen gas is pyrolusite.

12. A composition according to claim 1, further comprising an inorganic filler.

13. A composition according to claim 12, wherein the inorganic filler is selected from the group consisting of calcium carbonate, barium carbonate, dolomite and mixtures thereof.

14. A composition according to claim 1, wherein the composition comprises from 99 to 400 parts by weight of said finely ground waste glass.

15. A foamed glass molded product which comprises foamed glass prepared by:
   a. combining ingredients comprising:
      i. one part by weight of a finely ground silicate specialty glass formed by a process including melting containing at least 25 weight percent alkali metal oxide;
      ii. from 21 to 400 parts by weight of a finely ground silicate waste glass containing less than 16 weight percent alkali metal oxide;
      iii. water; and
      iv. a foaming agent;
   b. placing the combined ingredients into a mold; and
   c. heating the combined ingredients to a temperature at least sufficient to release gasses from the foaming agent and thereby foam the glass, said foamed glass molded product having a ratio of strength to density which increases as the amount of said finely ground silicate waste glass increases.

16. A foamed glass molded product according to claim 15, wherein the foaming agent comprises up to 10 weight percent of the ingredients, based on the weight of total solids, and comprises in combination, an organic substance which releases carbon and carbon monoxide gas when heated to a temperature of at least about 600° C. and a substance which releases oxygen gas when heated to a temperature of at least about 700° C., and wherein the combined ingredients are heated to a temperature of at least 700° C.

17. A foamed glass molded product according to claim 15, prepared by a process including the further steps of comminuting the combined ingredients into a granulate varying in size from 0.5 to 2.0 mm, and heating the granulate at 300° C. whereby it is dried, before the heating step to foam the glass.

18. A foamed glass molded product according to claim 15, wherein the ingredients combined comprise from 99 to 400 parts by weight of said finely ground waste glass.

* * * * *